(12) United States Patent  
Kraft (10) Patent No.: US 7,783,384 B2  
(45) Date of Patent: Aug. 24, 2010

(54) AMBIDEXTROUS ROBOTIC MASTER CONTROLLER

(76) Inventor: Brett W. Kraft, 8408 Ensley Pl., Prairie Village, KS (US) 66026

(*) Notice: Subject to any disclaimer, the term of this patent is extended or adjusted under 35 U.S.C. 154(b) by 479 days.

(21) Appl. No.: 11/821,718

(22) Filed: Jun. 25, 2007

(65) Prior Publication Data

US 2008/0033597 A1 Feb. 7, 2008

Related U.S. Application Data

(63) Continuation-in-part of application No. 29/271,095, filed on Jan. 10, 2007, now Pat. No. Des. 548,759, which is a continuation-in-part of application No. 29/260,690, filed on May 31, 2006, now Pat. No. Des. 545,334, and a continuation-in-part of application No. 11/444,067, filed on May 31, 2006, now Pat. No. 7,623,945.

(51) Int. Cl.
*G06F 19/00* (2006.01)

(52) U.S. Cl. .................. 700/245; 700/302; 901/6; 901/14; 901/27; 414/2

(58) Field of Classification Search ............. 700/245, 700/302, 250, 257, 264, 261, 275, 279, 303, 700/306, 900, 915, 916, 917, 918; 414/5, 414/7, 222; 16/110, 408, 430, 429; 901/32, 901/14, 29; 318/560, 568.11

See application file for complete search history.

(56) References Cited

U.S. PATENT DOCUMENTS

| | | | | |
|---|---|---|---|---|
| 2,858,947 A | * | 11/1958 | Chapman, Jr. ............. 414/5 |
| 3,028,126 A | * | 4/1962 | Holleman ................. 244/236 |
| 3,280,991 A | * | 10/1966 | Hedin et al. ................. 414/5 |
| 3,978,584 A | * | 9/1976 | Mayer ...................... 30/256 |
| 4,040,499 A | * | 8/1977 | Kestian et al. ............. 180/333 |
| 4,252,360 A | * | 2/1981 | Gallaher, Jr. ............. 414/732 |
| 4,481,591 A | * | 11/1984 | Spongh .................... 700/257 |
| 4,575,297 A | * | 3/1986 | Richter ..................... 414/5 |
| 4,608,526 A | * | 8/1986 | Martin et al. ............. 318/628 |
| 4,611,380 A | * | 9/1986 | Abe et al. .................. 29/430 |
| 4,648,782 A |   | 3/1987 | Kraft |
| 4,795,296 A | * | 1/1989 | Jau ......................... 414/5 |
| 4,805,900 A | * | 2/1989 | Sapp ....................... 482/112 |
| 4,883,400 A | * | 11/1989 | Kuban et al. ............. 414/2 |
| 4,892,457 A | * | 1/1990 | Bartlett et al. ........... 414/735 |
| 4,950,116 A | * | 8/1990 | Nishida .................... 414/5 |
| 4,962,448 A | * | 10/1990 | DeMaio et al. ............ 700/17 |

(Continued)

*Primary Examiner*—Khoi Tran  
*Assistant Examiner*—Kyung J Kim  
(74) *Attorney, Agent, or Firm*—John C. McMahon (57) ABSTRACT

An ambidextrous robotic master controller includes a mounting base secured to a support, a shoulder member pivotally connected to the mounting base and, connected in series to the shoulder, an upper arm member, a forearm member, an inner wrist member, and an outer wrist member. An ambidextrous grip link is pivotally connected to the outer wrist member and is movable to a right hand position or a left hand position. An ambidextrous hand grip member is pivotally connected to the grip link member. The controller includes suitable encoders engaged between connected elements thereof to sense and signal relative movement therebetween. The controller is usable by either a right or left handed person to control a manipulator device having links and joints analogous to the links and joints of the controller.

17 Claims, 11 Drawing Sheets

U.S. PATENT DOCUMENTS

| | | | |
|---|---|---|---|
| 5,019,761 A * | 5/1991 | Kraft .................... 318/568.11 |
| 5,021,969 A * | 6/1991 | Okamura et al. ............ 700/264 |
| 5,116,180 A * | 5/1992 | Fung et al. .................... 414/5 |
| 5,142,931 A * | 9/1992 | Menahem .............. 74/471 XY |
| 5,193,963 A * | 3/1993 | McAffee et al. ............... 414/5 |
| 5,389,865 A * | 2/1995 | Jacobus et al. ......... 318/568.11 |
| 5,447,403 A * | 9/1995 | Engler, Jr. ..................... 414/4 |
| 5,503,040 A * | 4/1996 | Wright ................. 74/471 XY |
| 5,577,417 A * | 11/1996 | Fournier ..................... 74/523 |
| 5,600,258 A * | 2/1997 | Graham et al. .............. 324/758 |
| 5,625,576 A * | 4/1997 | Massie et al. ................... 703/6 |
| 5,629,594 A * | 5/1997 | Jacobus et al. ......... 318/568.11 |
| 5,764,164 A * | 6/1998 | Cartabiano et al. ............ 341/22 |
| 5,768,947 A * | 6/1998 | Fee et al. ..................... 74/523 |
| 5,828,197 A * | 10/1998 | Martin et al. ............... 318/567 |
| 5,842,958 A * | 12/1998 | Rufa .......................... 482/112 |
| 6,042,555 A * | 3/2000 | Kramer et al. .............. 600/595 |
| 6,243,624 B1 | 6/2001 | Wu et al. .................... 700/260 |
| 6,325,808 B1 * | 12/2001 | Bernard et al. .............. 606/139 |
| 6,414,456 B1 * | 7/2002 | Hughes .................... 318/445 |
| 6,417,851 B1 * | 7/2002 | Lindholm et al. .......... 345/426 |
| D461,484 S | 8/2002 | Kraft |
| 6,493,608 B1 * | 12/2002 | Niemeyer ................... 700/302 |
| 6,587,750 B2 * | 7/2003 | Gerbi et al. ................. 700/245 |
| 6,705,871 B1 * | 3/2004 | Bevirt et al. ................. 434/262 |
| 6,801,008 B1 * | 10/2004 | Jacobus et al. ......... 318/568.11 |
| 6,853,965 B2 * | 2/2005 | Massie et al. ................... 703/6 |
| 6,949,106 B2 * | 9/2005 | Brock et al. ................. 606/130 |
| 7,042,184 B2 * | 5/2006 | Oleynikov et al. ..... 318/568.12 |
| 7,082,207 B2 * | 7/2006 | Rapps ........................ 381/381 |
| 7,110,888 B1 * | 9/2006 | Nicholls ...................... 702/27 |
| 7,155,316 B2 * | 12/2006 | Sutherland et al. .......... 700/248 |
| 7,206,626 B2 * | 4/2007 | Quaid, III ................... 600/407 |
| 7,248,944 B2 * | 7/2007 | Green ........................ 700/245 |
| 7,409,882 B2 * | 8/2008 | Massimo et al. ........... 73/865.4 |
| 7,410,338 B2 * | 8/2008 | Schiele et al. .................. 414/4 |
| 2002/0041169 A1 * | 4/2002 | Reck .......................... 318/560 |
| 2003/0023346 A1 * | 1/2003 | Salisbury et al. ............ 700/245 |
| 2003/0060927 A1 * | 3/2003 | Gerbi et al. ................. 700/245 |
| 2003/0109957 A1 * | 6/2003 | Sanchez et al. ............. 700/245 |
| 2004/0111183 A1 * | 6/2004 | Sutherland et al. .......... 700/245 |
| 2004/0251063 A1 * | 12/2004 | Patterson et al. ........... 180/65.1 |
| 2005/0029725 A1 * | 2/2005 | Glaser et al. ................ 269/229 |
| 2005/0060064 A1 * | 3/2005 | Valen et al. ................. 700/264 |
| 2005/0100627 A1 * | 5/2005 | McKinney .................. 425/267 |
| 2006/0259193 A1 * | 11/2006 | Wang et al. ................. 700/245 |
| 2007/0282483 A1 * | 12/2007 | Kraft ......................... 700/245 |
| 2008/0207289 A1 * | 8/2008 | Kang ............................ 463/7 |

\* cited by examiner

AMBIDEXTROUS ROBOTIC MASTER CONTROLLER

CROSS-REFERENCE TO RELATED APPLICATIONS

This is a Continuation-in-Part of U.S. Design patent application, Ser. No. 29/271,095 for MASTER CONTROLLER FOR ROBOTIC ARM, filed Jan. 10, 2007, which is a Continuation-in-Part of U.S. Design patent application, Ser. No. 29/260,690 for ROBOTIC MASTER CONTROLLER, filed May 31, 2006, and is a Continuation-in-Part of U.S. patent application, Ser. No. 11/444,067 for ROBOTIC MASTER CONTROLLER, filed May 31, 2006, all said applications being incorporated herein by reference.

BACKGROUND OF THE INVENTION

The present invention relates to master controllers for operating robotic devices and, in particular, to such a controller for a robotic device having an arm like structure wherein the controller senses movement in the user's own arm and causes such movement to be mimicked in the robotic device and wherein the controller can be configured to be operated using either the right arm or the left arm.

Many robotic devices utilize robotic arms or arm like structures (herein generally referred to as arms) for conducting work at a site of use. Often such robotic arms are utilized in environments which are dangerous or hazardous to humans, such as deep sea construction or exploration, chemical or explosives handling, outer space construction and the like. Consequently, it is advantageous to have a master controller that links to the robotic device and that allows a user, especially a user in a remote area from the robotic device to control the robotic device. That is, the robotic device is slaved to the master controller, follows the movement of the user's arm, including the hand, and transfers this movement to the robotic device, so that the robotic arm can be controlled by the user to make movements in an intuitive manner similar or equivalent to the motions the user would make, if the user were performing the task by hand.

The art of such controllers has been well developed in sensors that sense motion in a part of a user's body and transmit the motion to the robotic device. It is also possible to provide such controllers with force feedback so that the user senses reactionary forces applied to the robotic arm, as by engagement with other structures and the like. Such devices are disclosed in U.S. Pat. No. 5,019,761 which is incorporated herein by reference.

Prior master controllers have been developed that provide for mimicking some movement of the upper and lower arm, such as U.S. Pat. Nos. 5,019,761 and D461,484; however, the present device is an improvement over the devices shown in those patents. In some prior art devices, the controller is too bulky, heavy, or cumbersome. A more significant problem has to do with positioning the controller to sense roll (rotation about the long axis of the forearm) and then allowing the user a wide range of movement, while providing a sturdy and easy to use control mechanism.

Incorporating roll sensing and mimicking has always presented difficulty to designers of such controllers. This is because it is desirable in such controllers for a handle, hand control, or hand grip to be allowed to rotate almost one hundred and eighty degrees without the hand grip or the user hitting another part of the controller. The prior art has had difficulty in providing such a controller. In the U.S. Pat. No. 5,019,761 this was accomplished by providing a circular track or hoop that followed a structure at the end of a remainder of the controller. Such a track is fragile and can easily become dirty or damaged by nicks or the like in the metal, thereby significantly reducing smoothness of operation over time and producing an undesirable resistance. Other devices have tried to resolve this by placing the point of rotation of the hand grip outside the axis of rotation of the forearm, but this does not properly mimic the arm. Still other attempts have been made to place the roll pivot and sensor to the front of the hand, but this makes the device bulky and cumbersome to use, especially in tight quarters.

In the past, such controllers were designed so that the arm was placed on the inside of the controller or to the left of a controller for a right handed person. Because the forearm also rotates the hand to the right, when the hand turns from palm up to palm down, such movement of the hand would be interfere with by any structure that extended directly from the rest of the controller to the hand grip.

Consequently, the arm was moved to the outside or right side of a right handed controller, and structure was developed that cooperates with such placement and that allows the hand grip to roll with the hand while maintaining the axis of rotation of the hand grip aligned with the axis of rotation of the forearm.

In the past, multiple link controllers which mimic the arm have been provided mostly in right handed configurations, since about 90 percent of the population is right handed. Left handed configurations of such controllers could also conceivably be provided. In most cases, it is not practical to provide both a right handed and a left handed controller for a given implement to be controlled.

SUMMARY OF THE INVENTION

The present invention provides a robotic arm master controller having elements which when moved by either the right arm or the left arm of a user mimics the user's arm movements and conveys those movements to a robot slaved to the controller. An embodiment of the controller includes five rigid links, arm sections, or members joined in series at pivots with rotation sensors positioned to sense relative movements between each adjacent pair of connected members.

A hand control or hand grip including various finger operated controls is pivotally joined to the last of the members. The hand grip is sized and shaped to fit in the palm of the user and may extend outwardly at opposite ends thereof from the hand. The user holds the hand grip by reaching around the remainder of the controller to the outside or right side thereof for a right handed controller with the operator reaching around the left side of a left handed controller.

The last of the members includes an arched section that is sized and positioned so as to be pivotally joined to the hand grip at a location within the hand of a user when the hand grip is being grasped by a user. The arched section is further sized and positioned to enter the closed hand above the palm to the opposite side from the thumb when the hand is palm up and such that the outer edge of the hand opposite the thumb is cradled by the arched section. The axis of rotation of the pivot joining the arched section to the hand grip is generally aligned with an axis of rotation of the forearm during roll. The arched section extends over an arc of approximately ninety degrees. The hand can rotate generally between palm up and palm down without engaging obstructing structure of the controller during such rotation.

In this manner, the controller serves and provides for yaw and pitch associated with the upper arm and lower arm (at the wrist) and roll associated with turning the forearm about the longitudinal axis thereof. Preferably, the controller has axes of rotation associated with yaw, pitch and roll of the wrist that all intersect approximately in the center of the wrist.

The present invention provides an ambidextrous embodiment of the robotic arm master controller having elements which when moved by either the right arm or the left arm of a user mimics the user's arm movements and conveys those movements to a robot slaved to the controller. The controller includes five rigid links, arm sections, or members joined in series at pivots with encoders or sensors positioned to sense and signal relative movements between each adjacent pair of connected members. The ambidextrous controller includes an ambidextrous grip link member pivotally connected to an outer wrist member of the controller arm and movable between a right hand position and a left hand position. The ambidextrous controller may includes a grip link lock member engaged with said outer wrist member and the grip link member, such as a lock nut, and rotatable to secure the grip link member in the right or left hand position.

An ambidextrous hand grip is pivotally connected to the grip link member and is grasped by the user to move the overall controller arm in vertical or elevational directions, in horizontal sweeping directions, in extension and retraction directions, and in three axes relative to the user's wrist, including vertical wrist pitch, horizontal wrist yaw, and in forearm rolling actions. The hand grip member is typically grasped by the right hand of a right handed user with the right arm to the right of the controller arm and with the grip link member in the right hand position. A left handed user moves the grip link to the left hand position and grasps the hand grip with the left arm to the left of the controller arm.

OBJECTS AND ADVANTAGES OF THE INVENTION

Therefore, the objects of the invention include: providing a robotic master controller that allows for substantial roll movement and wherein the position sensors for such roll movement have a pivot associated therewith that is generally coaxial with rotation of the forearm; providing such a controller wherein roll movement between a final link of the controller and a distal hand grip is conveyed through a pivot rather than a track; providing such a controller wherein the roll pivot is located within the hand during usage and aligned with an axis of rotation of the forearm; providing such a controller wherein the arm of the user wraps about the outside of the controller rather than being located to the inside or left side of a right handed controller; providing such a controller that is not bulky or heavy and requires comparatively low maintenance; providing such a controller wherein the roll connection between the hand grip and the rest of the controller remains generally clean and free of nicks throughout the life of the controller thereby providing a smooth and resistance free movement therebetween; providing an ambidextrous controller for convenient operation by either a right handed user or a left handed user; providing such an ambidextrous controller including an ambidextrous grip link member pivotally connected to an outer wrist member of the arm and movable between a right hand position and a left hand position; providing such an ambidextrous controller including an ambidextrous hand grip member pivotally connected to the grip link member and capable of being grasped either by the right hand with the grip link in the right hand position or by the left hand with the grip link in the left hand position; and providing a controller or an ambidextrous controller which is economical to manufacture, which is efficient in use, and which is especially well adapted for the intended usage.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a robotic master controller in accordance with the present invention, mounted on a support 4 and operated by a user 5.

The controller 1 may be used with many different types of robotic devices wherein it is needed or desirable to mimic the movements of the user's arm or hand in the robotic device. Such a device can include robotic arms used on outer space craft, submergibles for exploration or construction, digging equipment such as backhoes and the like, robots that inspect or disarm hazardous or explosive materials or devices, and similar devices.

While the present controller may be used without force feedback, it is preferred that a force feedback system be incorporated herein along with the sensors and motors needed to provide such operation. A force feedback system is illustrated and described in the present inventor's U.S. Pat. No. 5,019,761 which is incorporated herein by reference. As the present invention is not directed to modification of the force feedback system or of the position sensors or motors, those structures are not reiterated herein in detail and one having ordinary skill in the art is directed to the U.S. Pat. No. 5,019,761 for an explanation of those structures and how to incorporate them within the present invention.

The support 4 can be any structure of sufficient size and strength to support the controller 1 during use. For this purpose, the support may be a desk or table top, a free standing base or even the arm rest of a user's chair. As the controller 1 may be utilized in tight quarters, such as aboard a deep sea exploratory submarine, it is preferred that both the size and weight be kept at a minimum. It is also necessary that the length of the controller 1 when fully extended forward not exceed the extended arm length of the user 5.

The controller 1 allows a user 5 to control yaw (side to side pivotal movement or pivot about a lateral plane through a longitudinal portion of a device) and pitch (up and down pivot of a longitudinal portion of a device relative to a vertical axis) of the upper portion 8 of the controller 1 corresponding to an upper arm 9 of the user 5, as well as yaw, pitch and roll (rotation about a longitudinal axis of a longitudinal portion of a device) of the lower portion 11 of the controller 1 corresponding to a lower arm or wrist 12 of a user 5.

In particular, the controller 1 has a base 15, a first member 16, a second member 17, a third member 18, a fourth member 19, a fifth member 20 and a hand grip 21. The base 15 is attached to the support 4 and does not move relative to the support 4 during use. The first member 16 has a first end 24 that rotates about an axis A relative to the base 15 at a joint 25. The first member 16 has a second end 26 that rotates about an axis B relative to a first end 27 of the second member 17 at a joint 28.

The second member 17 has a second end 30 that rotates about an axis C relative to a first end 31 of the third member 18 at a joint 33. The third member 18 has a second end 34 that rotates relative to an axis D relative to a first end 35 of the fourth member 19 at a joint 36. The fourth member 19 has a second end 37 that rotates about an axis E relative to a first end 38 of the fifth member 20 at a joint 39. The fifth member 20 has a second end 41 that is pivotally connected to the hand grip 21 and rotates about an axis E at pivot joint 42.

Located at each of the joints 25, 28, 33, 36, 39 and 42 and part thereof are interior sensors that sense the relative positions of the elements connected at the joints 25, 28, 33, 36, 39 and 42 and motors that provide force feedback to the user 5 relative thereto.

The axes B, C and D are parallel to each other and perpendicular to the axes A and E. The axes D and E are positioned or located so as to intersect with a wrist 50 of a user 5 during use. Rotation about the axis E controls yaw at the wrist 50, whereas rotation about the axis D determines or controls pitch at the wrist 50. Rotation about the axes B, C and D controls pitch relative to the user's upper arm 9, as well as extension or distance of the hand grip 21 relative to the base 15. Rotation about the axis A controls yaw relative to the user's upper arm 9. Rotation about the axis F controls roll of the hand grip 21 relative to the base 15.

The first member 16 extends upwardly from the base 15. The second member 17 and third member 18 each have an elongate and generally rigid outer structure enclosing the sensors and motors described above. The fourth member 19 includes a rigid portion 55 joined at the first end 35 to a cylindrical portion 56 that rotates coaxially with the axis D. The rigid portion 55 has a medial bend 58 therein and the second end 37 is joined to a cylindrical portion 60 that is coaxial with the axis E.

Figure 8:
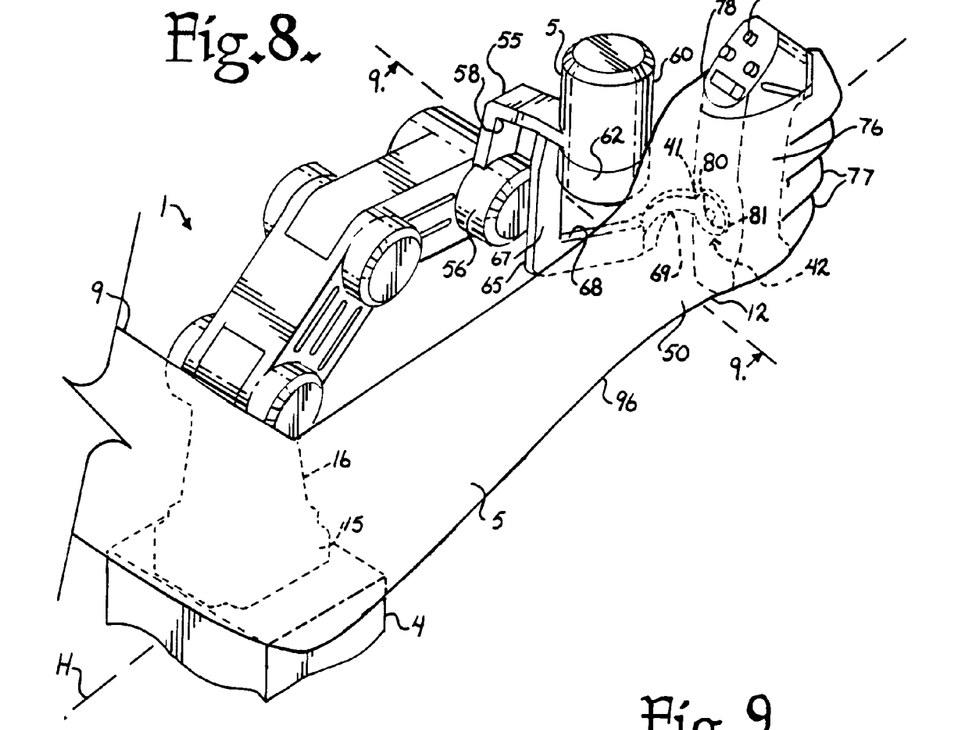
FIG. 8 is a perspective view of the controller mounted on a support and illustrating a user operating the controller.

The fifth member 20 in conjunction with the remainder of the controller 1 is sized and shaped to allow a user 5 to extend or reach the user's arm laterally around the controller 1 and grasp the hand grip 21, as is seen in FIG. 8. That is, when the controller 1 is designed for a right handed usage, the user 5 reaches laterally outwardly and forward or to the right around the controller to grasp the hand grip 21 and in the opposite manner for a controller 1 for a left handed usage.

Figure 9:
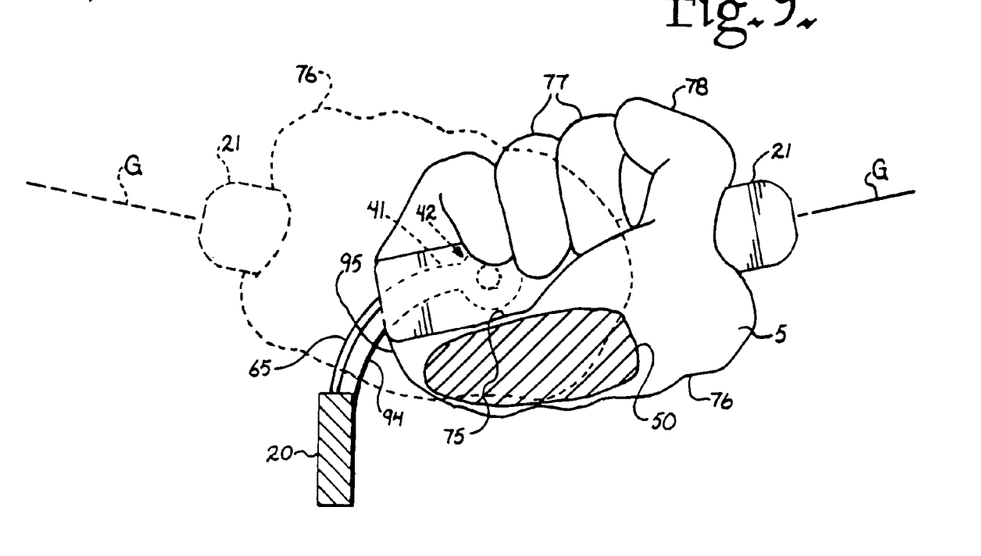
FIG. 9 is a cross sectional view of the controller, taken along line 9-9 of FIG. 8 showing rotation of a hand grip between a first position in solid lines and a second position in phantom lines.
Figure 10:
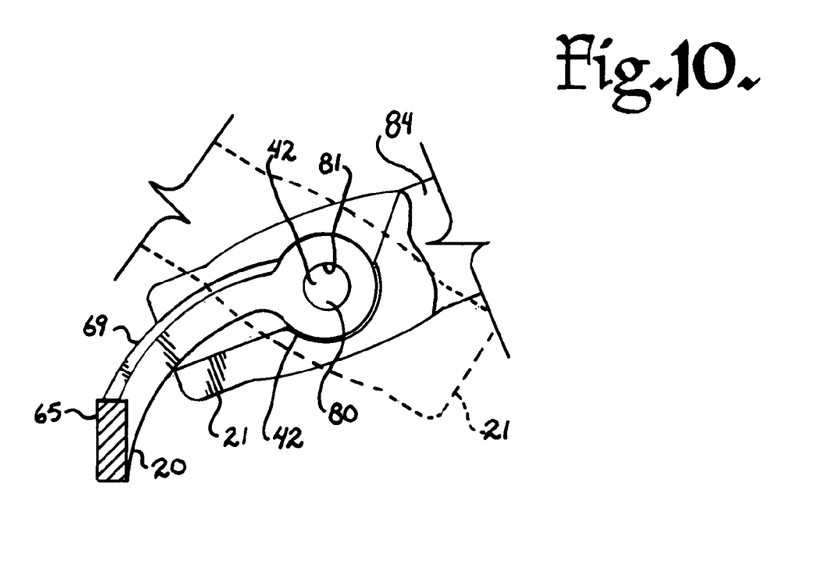
FIG. 10 is a fragmentary view of a portion of the controller showing rotation of the hand grip thereof between a first position in solid lines and a second position in phantom lines.

The hand grip 21 has a typical grip overall shape. The hand grip 21 is sized and shaped to comfortably fit in a palm 75 of a hand 76 of the user 5, as is seen in FIGS. 8 and 9, with fingers 77 and thumb 78 wrapping about the hand grip 21 on both sides. The hand grip 21 is pivotally joined at the joint 42 to the fifth arm 20 by a pivot pin 80 that extends between the hand grip 21 and the arched section 69 so as to be medially located from top to bottom and generally centrally located from side to side. The pin 80 is located in a bore 81 in the arch section 69. A cover 84 extends along the rear of the hand grip 21 so as to protect the user's hand 76 from engagement with the pivot 42; however, the left lateral side 85 of the cover 84 is open to provide a slot 86 to allow the hand grip 21 to rotate relative to the arch section 69. In this manner, the hand grip 21 can rotate about axis F over a range of approximately 160°, as is shown in FIG. 9, although this range may be varied somewhat in certain applications.

The hand grip 21 can be variously equipped with push buttons 90, depress controls 91, rocker switches 92 and the like that correspond to certain elements that are to be controlled in the robotic arm slaved to the controller 1, such as claws or the like. In certain situations the function of the various grip elements on the hand grip 21 can be modified electronically or physically to allow the user 5 to select control of different aspects of the robotic device, different robotic devices or devices that provide information about the robotic device.

The arched section 69 is important to the function of the controller 1 in accordance with the invention. In particular, it allows the hand grip 21 to be comfortably held in the hand 76 of the user without interfering with roll of the hand grip 21 over a comparatively wide range of motion. This is seen especially in FIG. 9 wherein the hand 76 and hand grip 21 that are shown in solid lines are rotated (or rolled) to the right and are shown in phantom lines rotated to the left. The elongate centerline of the hand grip is indicated in each case by the axis G.

The arched section 69 has a hand facing surface 94 that is curved and sized and shaped to allow the hand's palm 75 to swing upward and to the right as the hand grip 21 is rotated to the right and, thereafter, cradle an outer portion 95 of the palm 75 when at the full extent of rotation to the right. The surface 94 extends over an arc of approximately ninety degrees.

The pivot 42 is positioned so as to be located generally in the middle of the grasping hand 76 just above the palm 75 and generally along an axis H which passes through the elongate center of a forearm 96 associated with the hand 76 and remaining generally in that location as the hand 76 rolls or rotates between the maximum ranges thereof, as seen in FIG. 9. In this manner, the yaw, pitch and roll associated with the user's lower arm 12 are imparted to the controller 1, as the user 5 moves, thus conveying substantially equivalent movement to a robotic device slaved to the controller 1.

In use, the user 5 grasps the hand grip 21 in the user's hand 76 and moves his arm upper portion 8 and hand 76 at the wrist 50 to control similar structure on a robotic device. The position, location and shape of the fifth member 20 and especially the arched section 69 allows the controller 1 to follow roll of the user's hand 76 over a wide range of rotation without the hand 76 engaging obstructing structure of the controller 1 and with the structure associated with roll. The pivot 42 and hand grip 21 where joined to pivot 42, are especially located within the hand 76 and generally in line with the forearm rotational axis H. Because the arched section 69 enters the hand holding the hand grip 21 opposite the thumb 78 and the pivot 42 is located in the palm 75, the hand 76 can turn completely over, as seen in FIG. 9, without interference from other parts of the controller 1, while still allowing the pivot axis F to be generally maintained in alignment with the arm axis H.

Figure 11:
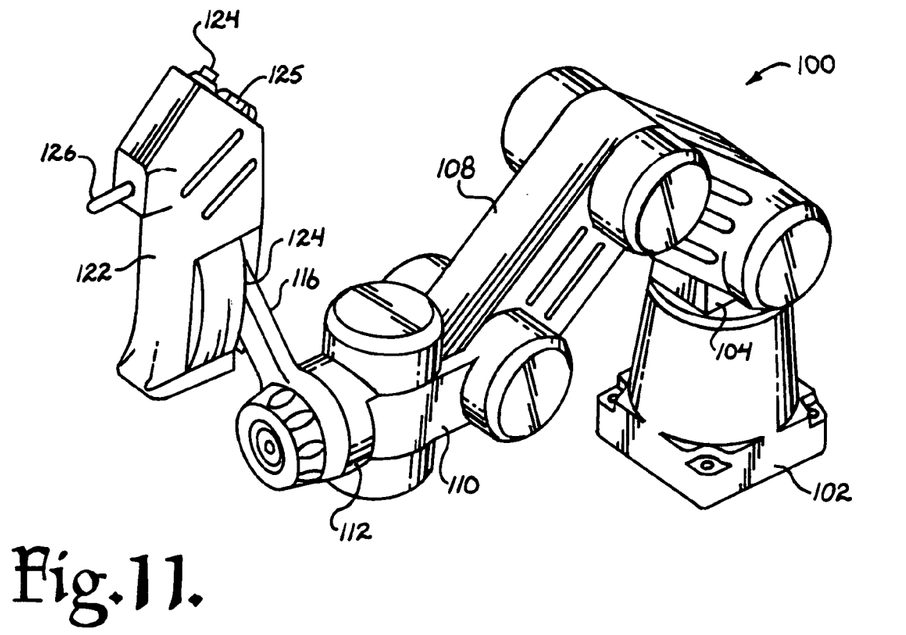
FIG. 11 is a perspective view of an ambidextrous embodiment of the robotic master controller.
Figure 12:
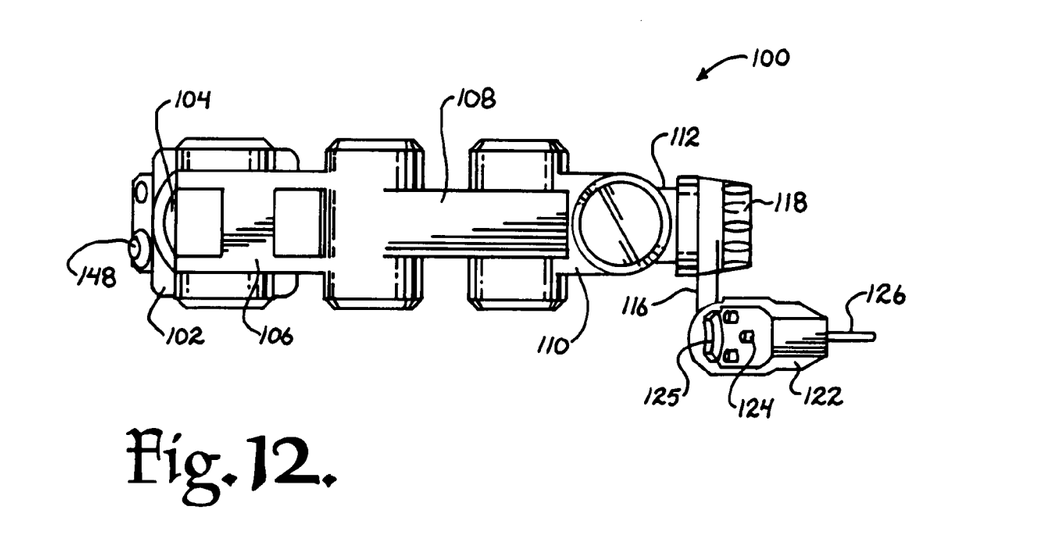
FIG. 12 is a top plan view of the ambidextrous controller with a hand grip member thereof illustrated in a right hand position.
Figure 13:
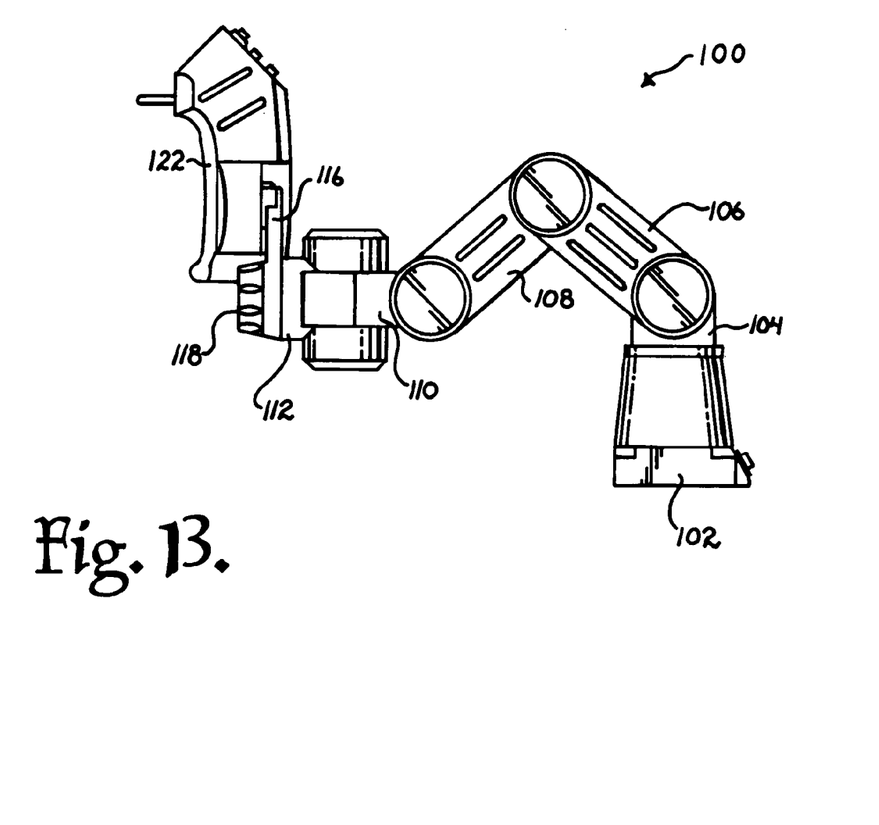
FIG. 13 is a left side elevational view of the ambidextrous controller.
Figure 14:
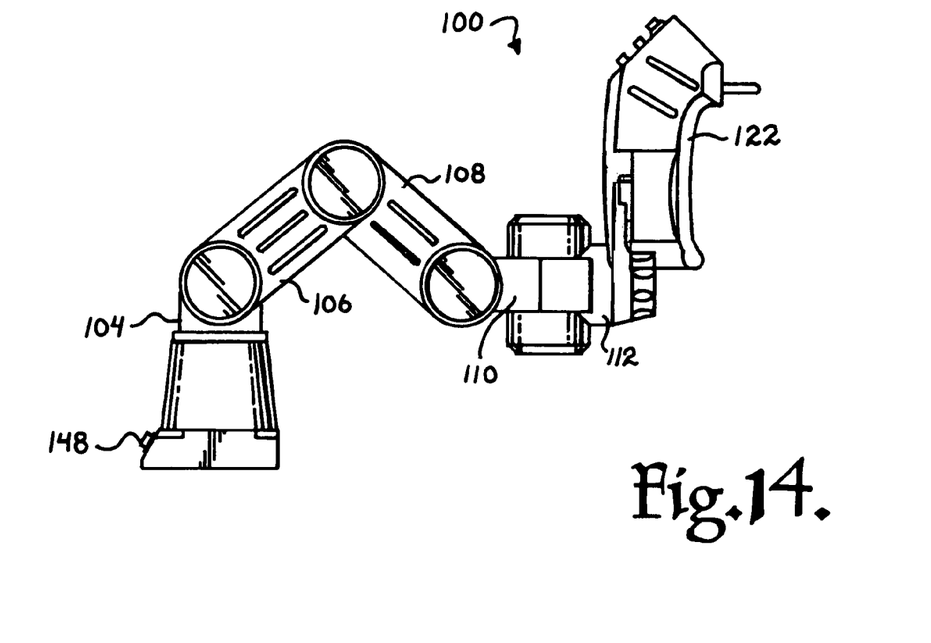
FIG. 14 is a right side elevational view of the ambidextrous controller.

FIGS. 11-20 illustrate an ambidextrous embodiment 100 of the robotic master controller of the present invention. The ambidextrous controller 100 can be adjusted for convenient use by either a right handed user or a left handed user. The ambidextrous controller 100 has many components which are similar to the controller 1. Referring to FIG. 11, the illustrated ambidextrous controller 100 includes a mounting base 102 which can be secured to a support member (not shown). A shoulder member 104 is pivotally mounted within the mounting base 102 for swinging movement about a generally vertical axis. An upper arm member 106 is pivotally connected to the shoulder member 104 for elevational movement about a generally horizontal axis. A lower arm or forearm member 108 is pivotally connected to the upper arm 106 for pivotal movement about a generally horizontal axis. The controller 100 includes an inner wrist member 110 and an outer or distal wrist member 112 which are connected to the forearm 108. The inner wrist member 110 is pivotally connected to the forearm 108 to enable wrist pitch movement about a generally horizontal axis. The outer wrist member 112 is pivotally connected to the inner wrist member 110 for wrist yaw movement about a generally vertical axis.

Figure 1:
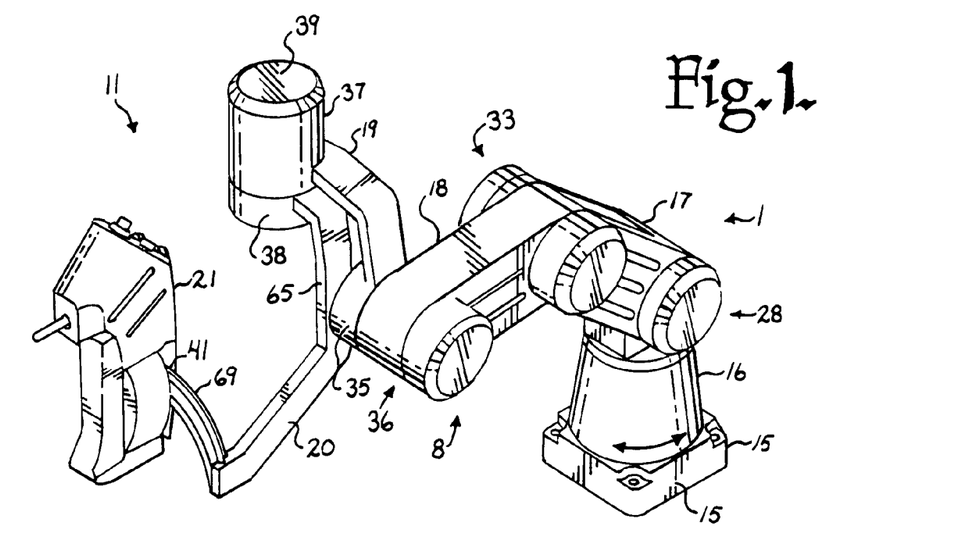
FIG. 1 is a perspective view of a master controller in accordance with the present invention.
Figure 2:
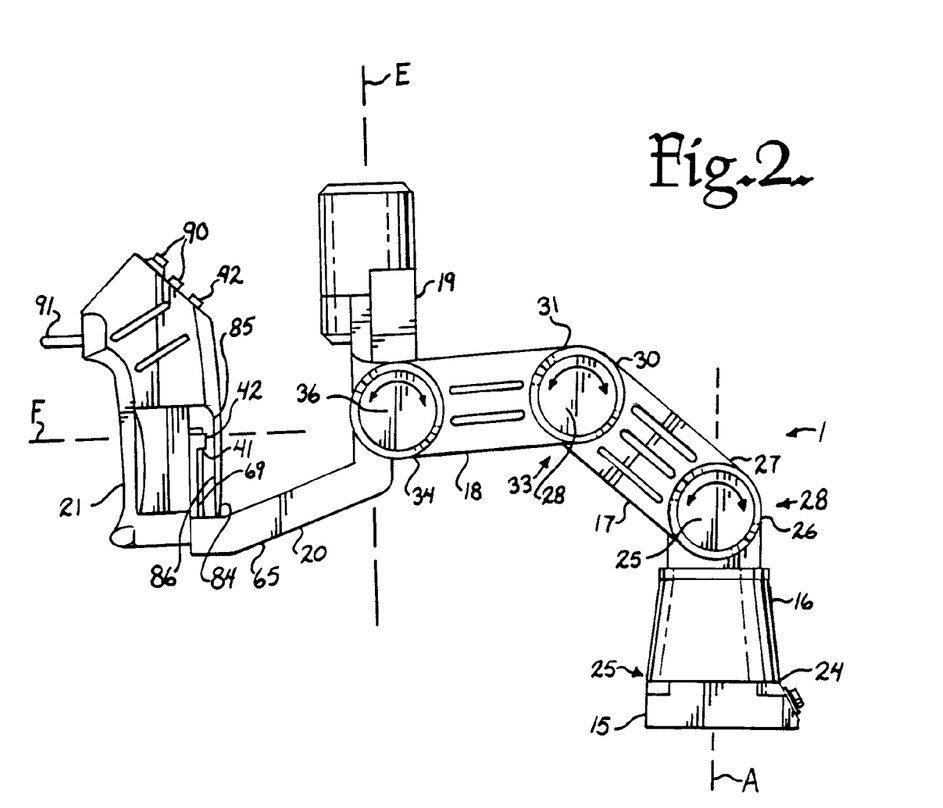
FIG. 2 is a first side elevational view of the controller.
Figure 3:
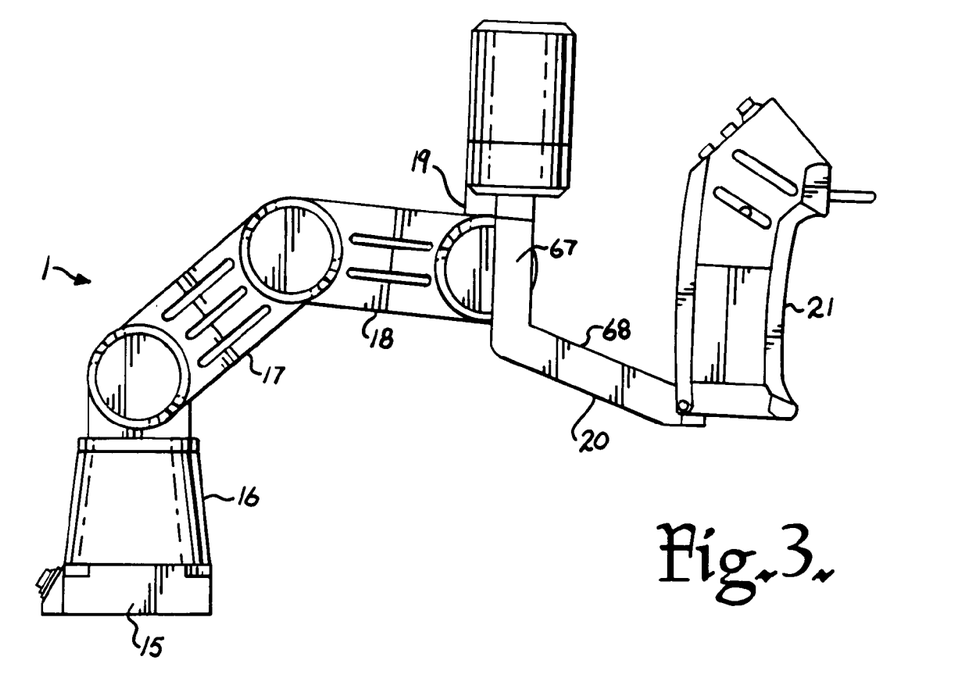
FIG. 3 is a second side elevational view of the controller.
Figure 4:
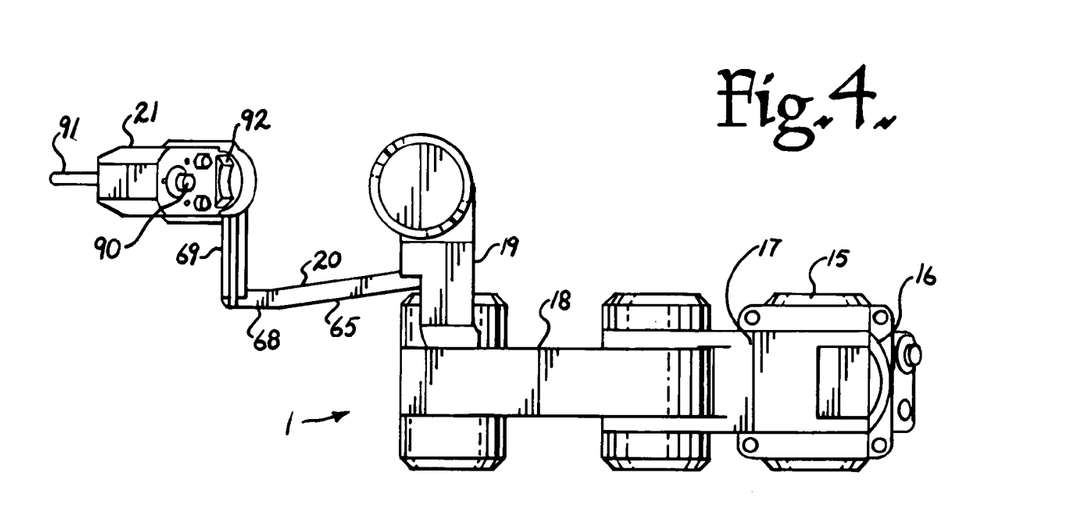
FIG. 4 is a top plan view of the controller.
Figure 5:
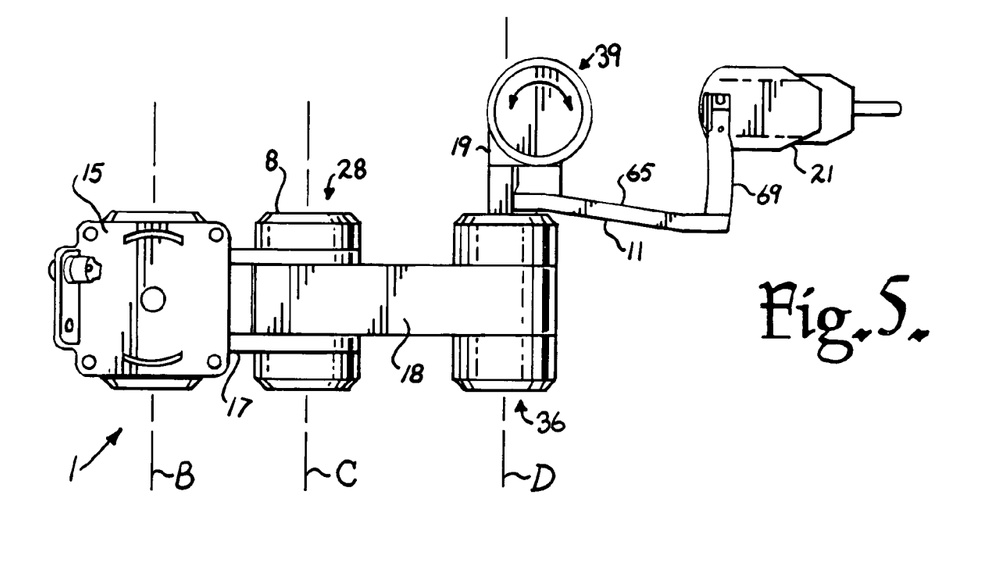
FIG. 5 is a bottom plan view of the controller.
Figure 6:
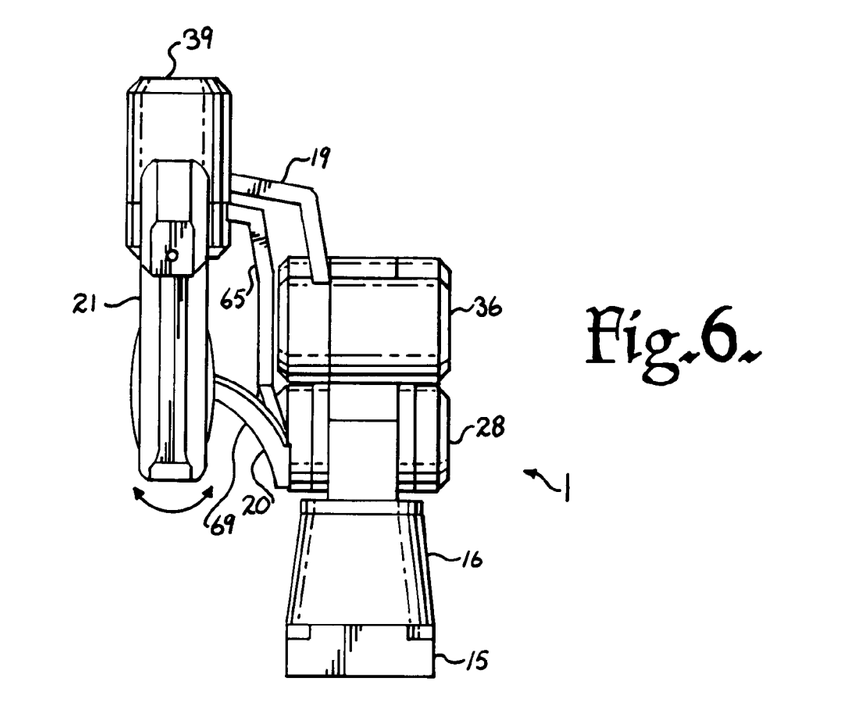
FIG. 6 is a front elevational view of the controller.
Figure 7:
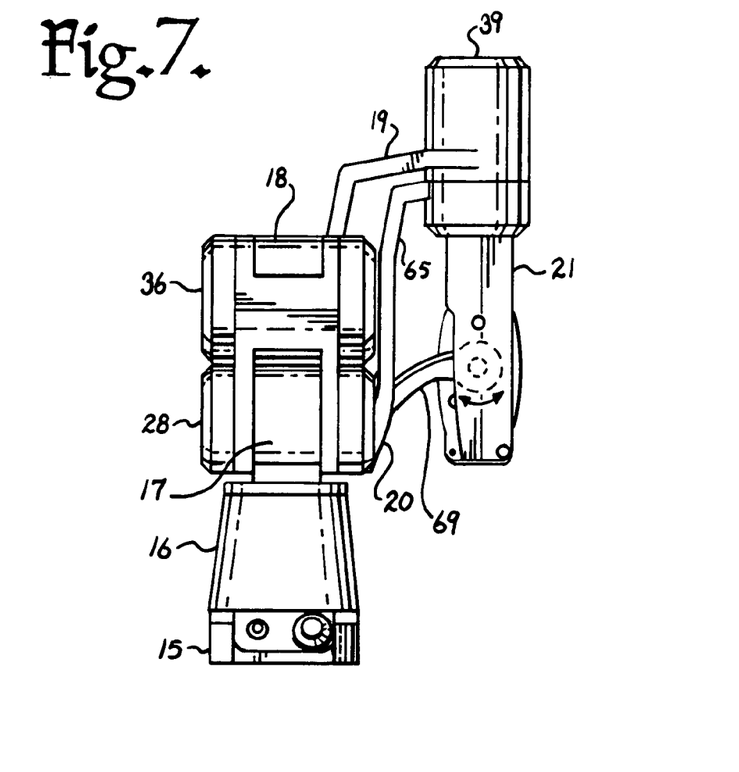
FIG. 7 is a rear elevational view of the controller.
Figure 15:
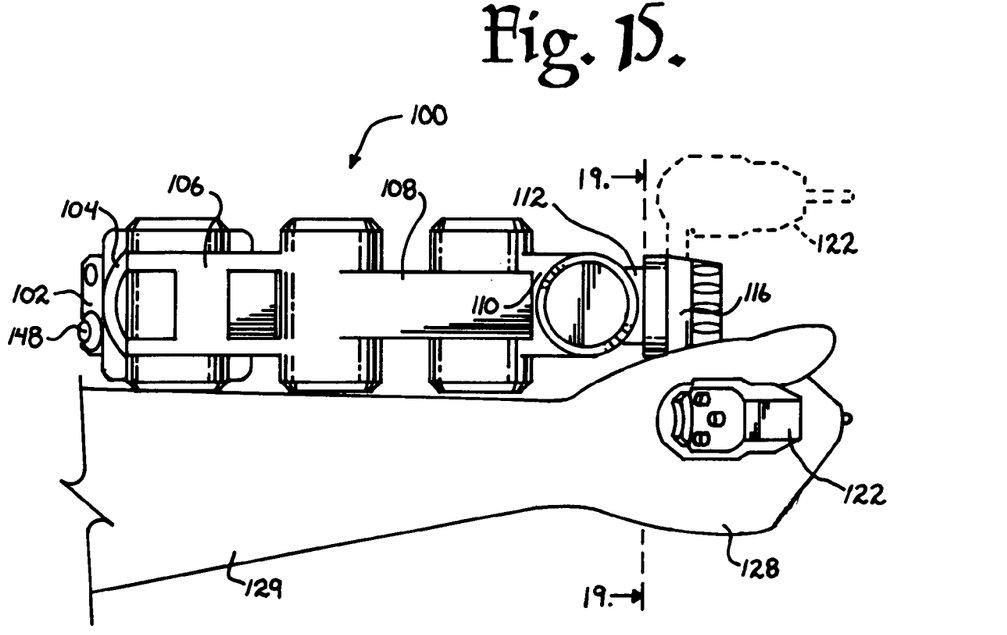
FIG. 15 is a view similar to FIG. 12 with the hand grip of the ambidextrous controller being grasped by a right hand, with a left handed position of the hand grip shown in phantom lines.
Figure 16:
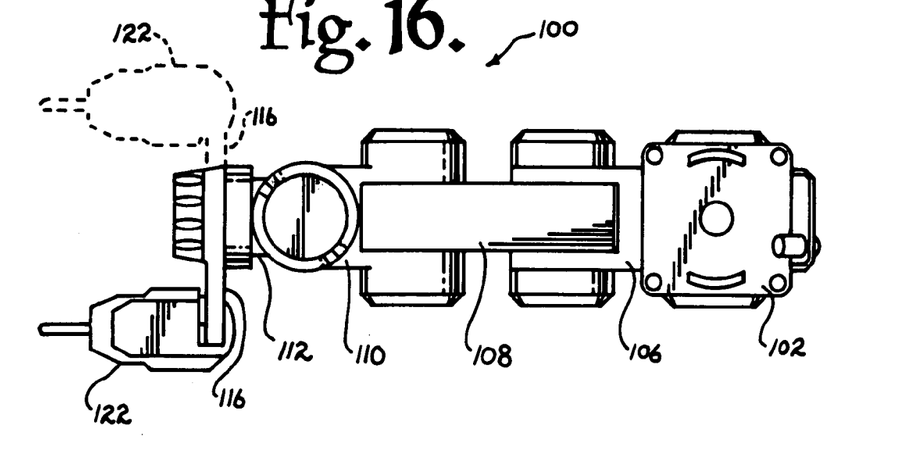
FIG. 16 is a bottom plan view of the ambidextrous controller with the hand grip shown in the right handed position, a left hand position of the hand grip being shown in phantom lines.
Figure 17:
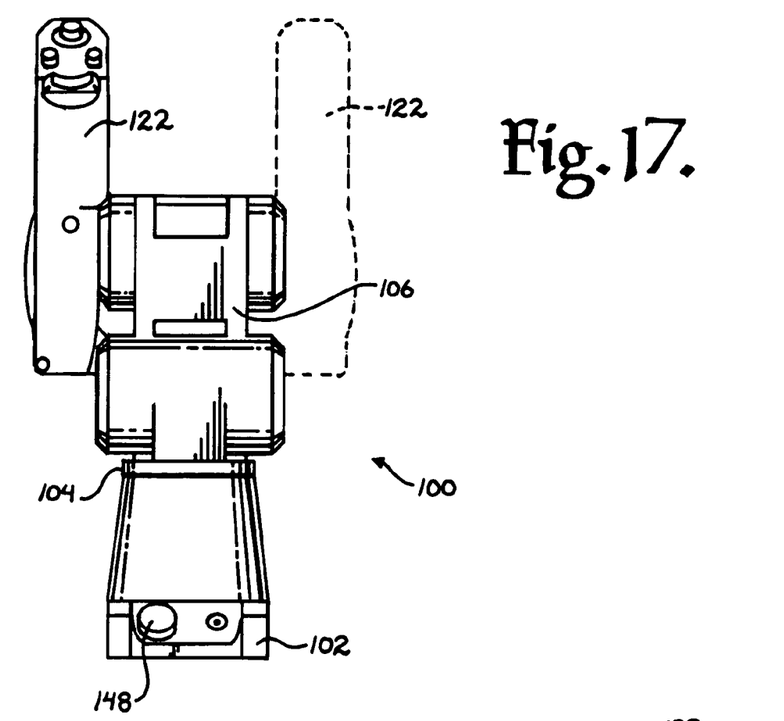
FIG. 17 is a rear elevational view of the ambidextrous controller with the hand grip shown in the left handed position, the right handed position of the hand grip being shown in phantom lines.
Figure 18:
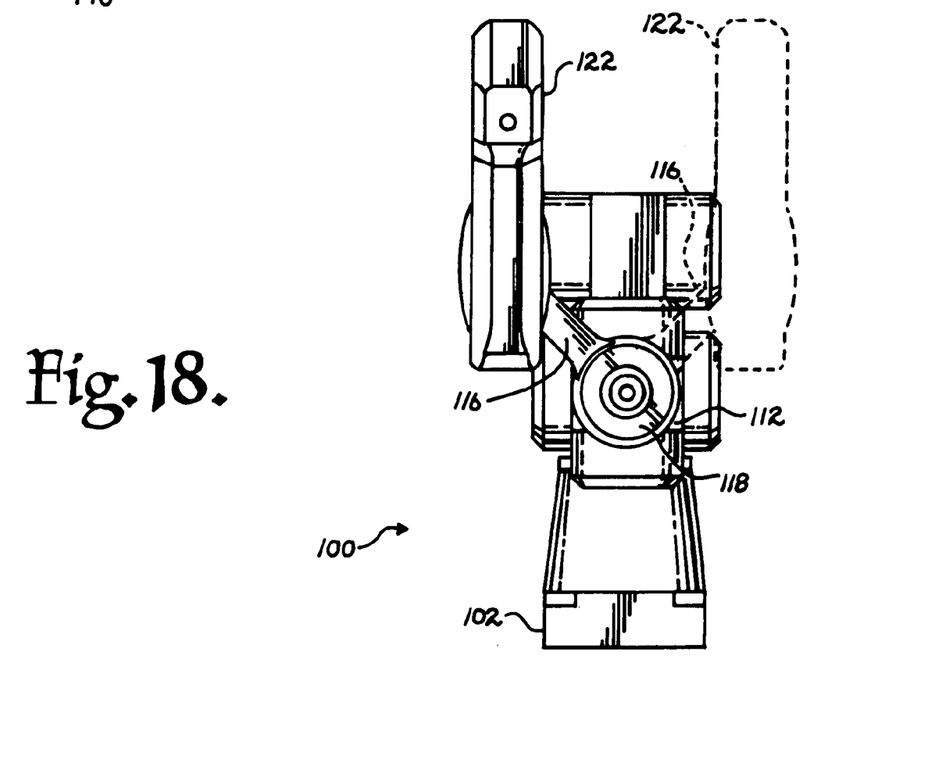
FIG. 18 is front elevational view of the ambidextrous controller with the hand grip shown in the right handed position, a left hand position of the hand grip being shown in phantom lines.
Figure 19:
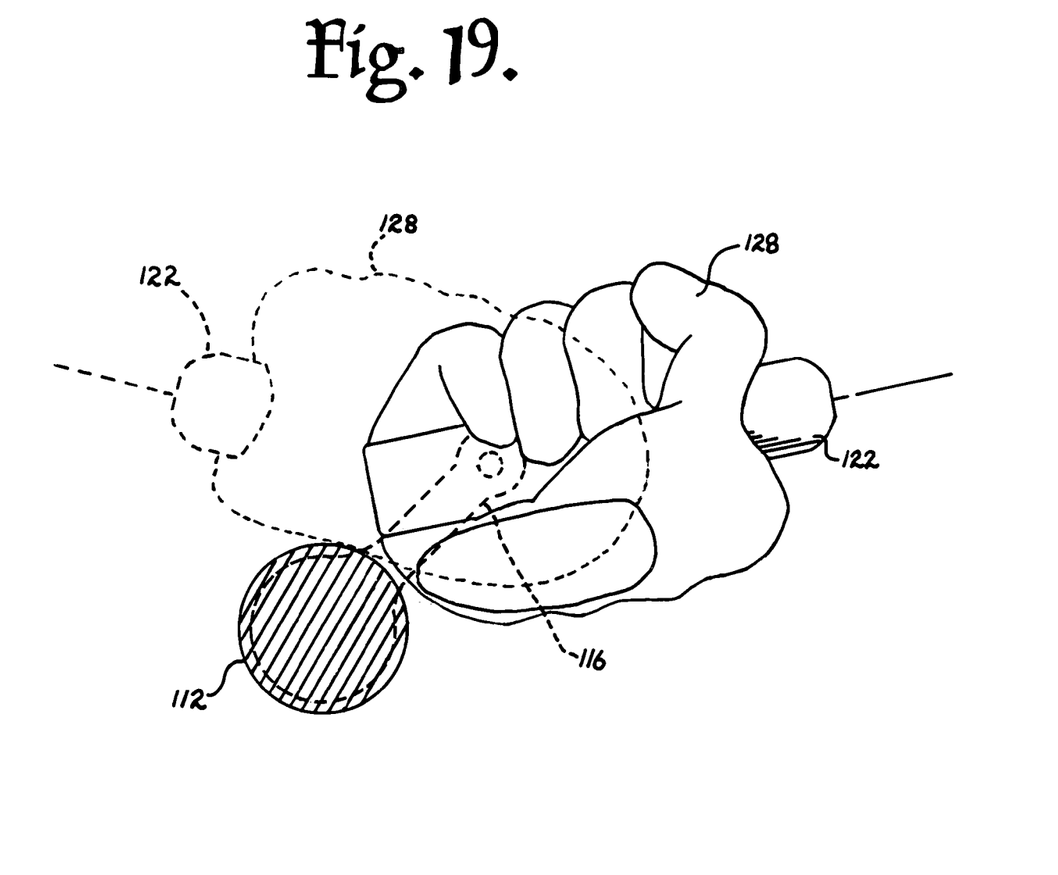
FIG. 19 is a cross sectional view of the ambidextrous controller taken along line 19-19 of FIG. 15 and illustrates a hand grip link in the right handed position with the hand grip pivoted to an extreme angle to the right in solid lines and to an extreme angle to the left in phantom lines.

The illustrated ambidextrous controller 100 includes an ambidextrous grip link member 116 which is pivotally connected to the outer wrist member 112 and is movable between a right hand position as illustrated in FIG. 1 and a left hand position as shown in phantom lines in FIG. 15. The grip link member 116 may be secured in either the right hand or left hand positions by a grip link lock member 118, which may be in the form of a grip link lock nut which is threadedly engaged with a bolt or other threaded member (not shown) extending forwardly from the outer wrist member 112. The controller arm 110 may incorporate detent members (not shown) between the grip link member 116 and the outer wrist member 112 to positively indicate the right and left hand positions of the grip link member 116 to thereby facilitate proper location of the grip link member 116 relative to the outer wrist member 112.

The illustrated controller 100 includes an ambidextrous hand grip member 122 which is pivotally connected to the grip link member 116 for pivoting motion relative thereto which mimic a forearm roll of a user of the controller 100. The hand grip member 122 includes a transversely open slot 124 located at a rear side thereof through which the grip link member 116 extends either to the left side of the user when the grip link member 116 is in the right hand position, as shown in FIG. 1, or the right side of the user when the grip link member 116 is located in the left hand position. The illustrated hand grip member 122 may include any combination of thumb operated button switches 124, rocker switches 125, and/or a forefinger operated button or trigger 126.

The ambidextrous hand grip 122 is sized and shaped for comfortable grasping by either the right hand or the left hand of the user. Referring to FIG. 15, when the grip link member 116 is located in the right hand position, the right hand 128 of the user grasps the hand grip 122 with the right arm 129 positioned to the left of the controller arm assembly 100. Conversely, when the grip link member 116 is located in the left hand position, as shown in phantom lines in FIG. 15, a left hand (not shown) of the user grasps the hand grip 122 with the left arm (not shown) positioned to the left of the controller arm assembly 100.

Figure 20:
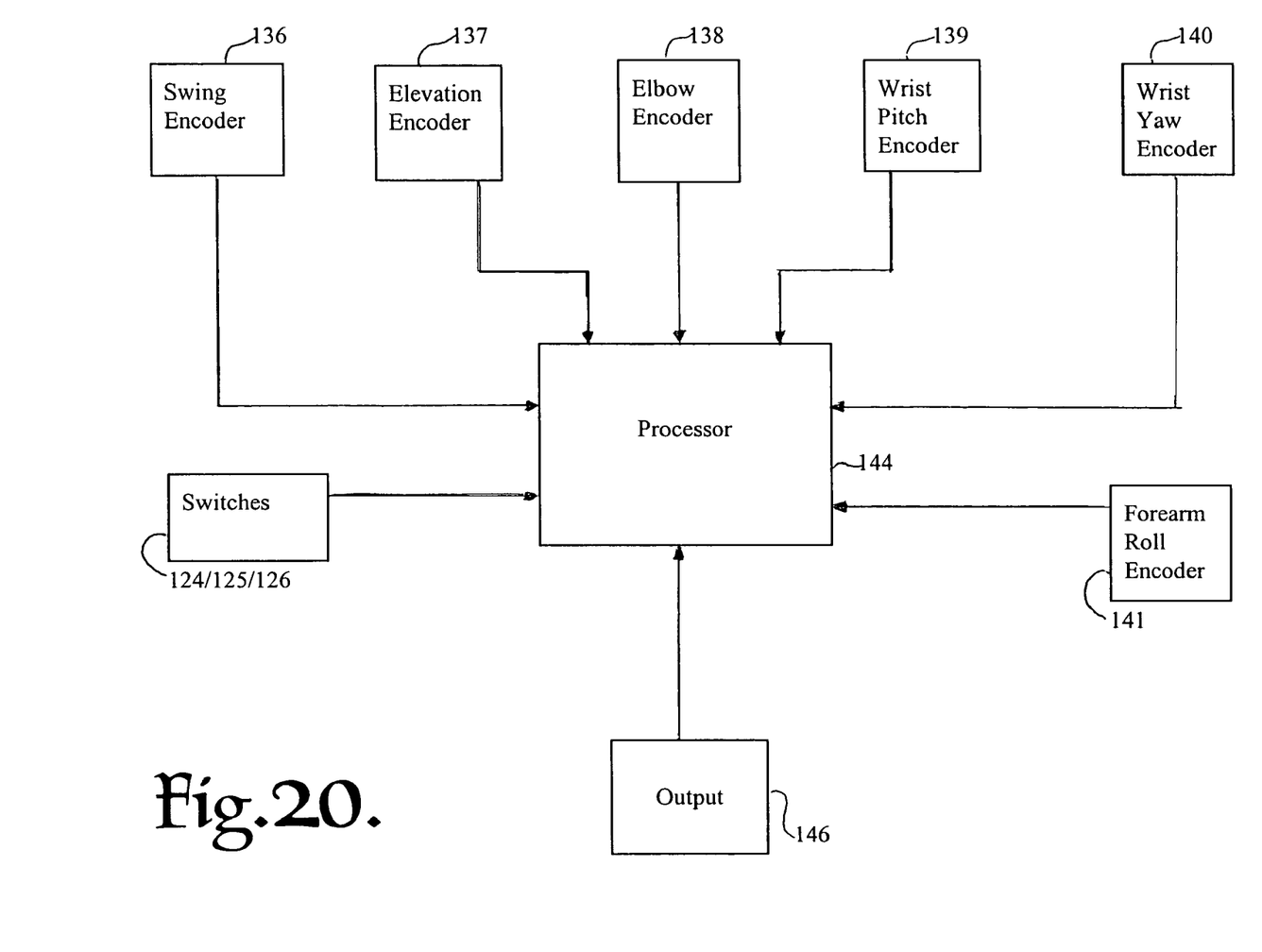
FIG. 20 is a block diagram illustrating a plurality of angle encoders engaged between pivoting elements of the ambidextrous controller to detect and signal relative pivoting motion between adjacent elements of the controller.

Referring to FIG. 20, the illustrated controller 100 includes circuitry 134 for sensing and signaling relative movement between components of the controller 100. A swing encoder 136 is engaged between the mounting base 102 and the shoulder member 104 to detect and signal relative motion therebetween. An elevation encoder 137 is engaged between the shoulder member 104 and the upper arm 106 to detect and signal elevation movement of the upper arm member 106 relative to the shoulder member 104. An elbow encoder 138 is engaged between the upper arm 106 and the forearm member 108. A wrist pitch encoder 139 is engaged between the forearm member 108 and the inner wrist member 110, while a wrist yaw encoder 140 is engaged between the inner wrist member 110 and the outer wrist member 112. Finally, a forearm roll encoder 141 is engaged between the grip link member 116 and the hand grip 122.

The encoders 136-141 may be any conventional type of rotary encoders which can detect relative pivoting motion and provide a signal or electrical parameter which varies in proportion to the amount of pivoting motion, such as various kinds of digital encoders, potentiometers, or the like. The encoders 136-141 may be interfaced to a digital processor 144 which reads the encoders, performs analog to digital conversion if necessary, and provides numeric data representing detected motions of the elements of the controller 100 to an output port 146. The output port 146 may be read by communication circuitry (not shown) which transmits inputs to an operation or manipulator device (not shown) which the controller 100 is to control. An example of such a manipulator is shown in U.S. Pat. No. 4,648,782. Although not shown, the controller 100 may incorporate means such as various kinds of servomotors in cooperation with the encoders 136-141 to provide physical force feedback to elements of the controller 100 to provide a "feel" to the controller 100. The switches 124-126 may also be interfaced to the processor 144.

Whenever it is necessary to change the configuration of the controller 100 from a right hand controller to a left hand controller or vice versa, it is preferable to disable the controller 100 to avoid undesired movement of a manipulator device being controlled by the controller. For this purpose, the controller 100 may be provided with an activation switch or on/off switch 148, illustrated in FIG. 12 as located on the mounting base 102, and interfaced to the digital processor 144. In most cases, it would be desirable to change the state of the controller 100 between right handed and left handed prior to use of the controller 100 to control a manipulator. Additionally, it is desirable to begin operation of the controller 100 and the manipulator with each in an initial position or "zero" position. Thereafter, when the manipulator and controller 100 are activated, the manipulator mimics movements of elements of the controller arm 100.

It is to be understood that while certain forms of the present invention have been illustrated and described herein, it is not to be limited to the specific forms or arrangement of parts described and shown.

What is claimed and desired to be secured by Letters Patent is:

1. An ambidextrous controller arm apparatus for controlling an operation and comprising:
   (a) a base member adapted for securing to a support structure;
   (b) an ambidextrous robotic master controller arm connected to said base member in such a manner as to be movable relative thereto to thereby control said operation;
   (c) an ambidextrous grip link member pivotally connected to said controller arm in spaced relation to said base member, said grip link member being pivotable between a right hand position and a left hand position; and
   (d) an ambidextrous hand grip member connected to said grip link member to enable grasping to move said arm to control said operation, and an encoder engaged between said grip link member and said hand grip member.

2. An apparatus as set forth in claim 1 wherein:
   (a) said hand grip member is pivotally connected to said grip link member.

3. An apparatus as set forth in claim 2 wherein:
   (a) a grip encoder engaged between said hand grip member and said grip link member, said grip encoder sensing and signaling relative pivotal movement between said hand grip member and said grip link member.

4. An apparatus as set forth in claim 1 and including:
   (a) a base encoder engaged between said base member and said controller arm, said base encoder sensing and signaling relative movement between said base member and said controller arm.

5. An apparatus as set forth in claim 1 wherein:
   (a) said control arm is formed by at least two arm links pivotally connected together; and
   (b) an arm encoder is engaged between said arm links, said arm encoder sensing and signaling relative pivoting between said arm links.

6. An apparatus as set forth in claim 1 and including:
   (a) a grip link lock member coupled with said controller arm and movable to releasably secure said grip link member in said right hand position or said left hand position.

7. An apparatus as set forth in claim 1 and including:
   (a) a grip link lock member threadedly coupled with said controller arm and rotatable to releasably secure said grip link member in said right hand position or said left hand position.

8. An apparatus as set forth in claim 1 and including:
   (a) at least one switch unit positioned on said hand grip member, said switch unit enabling control of a function remote from said apparatus.

9. An ambidextrous controller arm apparatus comprising:
   (a) a base member adapted for securing to a support structure;
   (b) a shoulder member pivotally connected to said base member and enabling swing movement of said ambidextrous robotic master controller arm;
   (c) an upper arm member pivotally connected to said shoulder member and enabling elevation movement of said ambidextrous robotic master controller arm;
   (d) a forearm member pivotally connected to said upper arm member and cooperating with said upper arm member to enable extension and retraction of said ambidextrous robotic master controller arm;
   (e) an ambidextrous grip link member pivotally connected to said forearm member and pivotable between a right hand position and a left hand position;
   (f) an ambidextrous hand grip member pivotally connected to said grip link member and enabling a forearm roll movement; and
   (g) a respective encoder engaged between said base member and said shoulder member, between said shoulder member and said upper arm member, between said upper arm member and said forearm member, and between said grip link member and said hand grip member, each of the encoders sensing and signaling relative pivotal movement between the sets of pivotally connected members.

10. An apparatus as set forth in claim 9 and including:
    (a) a wrist member pivotally connected to said forearm member, having said grip link member pivotally connected thereto, and enabling a wrist pitch movement of said hand grip member.

11. An apparatus as set forth in claim 9 and including:
    (a) a wrist member pivotally connected to said forearm member, having said grip link member pivotally connected thereto, and enabling a wrist yaw movement of said hand grip member.

12. An apparatus as set forth in claim 9 and including:
    (a) an inner wrist member pivotally connected to said forearm member and enabling a wrist pitch movement of said hand grip member; and
    (b) an outer wrist member pivotally connected to said inner wrist member, having said grip link member pivotally connected thereto, and enabling a wrist yaw movement of said hand grip member; and
    (c) a wrist pitch encoder engaged between said inner wrist member and said forearm member to sense and signal relative pivotal movement therebetween and a wrist yaw encoder engaged between said outer wrist member and said inner wrist member to sense and signal relative pivotal movement therebetween.

13. An apparatus as set forth in claim 12 and including:
    (a) a grip link lock nut threadedly coupled with said outer wrist member and rotatable to releasably secure said grip link member in said right hand position or said left hand position.

14. An apparatus as set forth in claim 9 and including:
(a) at least one switch unit positioned on said hand grip member, said switch unit enabling control of a function remote from said apparatus.

15. An ambidextrous controller arm apparatus comprising:
(a) a base member adapted for securing to a support structure;
(b) a shoulder member pivotally connected to said base member and enabling swing movement of said ambidextrous robotic master controller arm;
(c) an upper arm member pivotally connected to said shoulder member and enabling elevation movement of said ambidextrous robotic master controller arm;
(d) a forearm member pivotally connected to said upper arm member and cooperating with said upper arm member to enable extension and retraction of said ambidextrous robotic master controller arm;
(e) an inner wrist member pivotally connected to said forearm member and enabling a wrist pitch movement;
(f) an outer wrist member pivotally connected to said inner wrist member and enabling a wrist yaw movement;
(g) an ambidextrous grip link member pivotally connected to said outer wrist member and pivotable between a right hand position and a left hand position;
(h) an ambidextrous hand grip member pivotally connected to said grip link member and enabling a forearm roll movement; and
(i) a respective encoder engaged between said base member and said shoulder member, between said shoulder member and said upper arm member, between said upper arm member and said forearm member, between said forearm member and said inner wrist member, between said inner wrist member and said outer wrist member, and between said grip link member and said hand grip member, each of the encoders sensing and signaling relative pivotal movement between the sets of pivotally connected members.

16. An apparatus as set forth in claim 15 and including:
(a) a grip link lock nut threadedly coupled with said outer wrist member and rotatable to releasably secure said grip link member in said right hand position or said left hand position.

17. An apparatus as set forth in claim 15 and including:
(a) at least one switch unit positioned on said hand grip member, said switch unit enabling control of a function remote from said apparatus.

* * * * *